US012343986B2

(12) United States Patent
Yamasaki

(10) Patent No.: US 12,343,986 B2
(45) Date of Patent: Jul. 1, 2025

(54) PRINTING CONTROL METHOD, PRINTING CONTROL DEVICE, AND STORAGE MEDIUM

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 162 days.

(21) Appl. No.: 18/112,165

(22) Filed: Feb. 21, 2023

(65) Prior Publication Data

US 2023/0264467 A1 Aug. 24, 2023

(30) Foreign Application Priority Data

Feb. 22, 2022 (JP) ................................ 2022-025282

(51) Int. Cl.
*B41J 2/045* (2006.01)
*B41J 2/21* (2006.01)

(52) U.S. Cl.
CPC ....... *B41J 2/04508* (2013.01); *B41J 2/04586* (2013.01); *B41J 2/2135* (2013.01)

(58) Field of Classification Search
CPC ... B41J 29/38; B41J 2/01; B41J 2/2135; B41J 25/003; B41J 29/46; B41J 2/21; B41J 2/0458; G06K 15/10
See application file for complete search history.

(56) References Cited

U.S. PATENT DOCUMENTS 6,068,365 A * 5/2000 Nagoshi ................. B41J 2/2135 347/43
2007/0242093 A1* 10/2007 Fujimoto ............. B41J 2/04543 347/9
2009/0141293 A1* 6/2009 Fujimoto ............. G06K 15/107 358/1.8
2016/0221373 A1* 8/2016 Nishikawa ................ B41J 2/51
(Continued)

FOREIGN PATENT DOCUMENTS

JP 2004-017464 A 1/2004
JP 2007-118595 A 5/2007
JP 2008-254303 A 10/2008
(Continued)

OTHER PUBLICATIONS

Machine Translation of JP-2010143026-A Retrieved Sep. 2024 (Year: 2010).*
(Continued)

*Primary Examiner* — John Zimmermann
(74) *Attorney, Agent, or Firm* — Fitch, Even, Tabin & Flannery LLP

(57) ABSTRACT

A printing control method includes, in a case where a print head is inclined from a state parallel to a first direction toward a second direction, and a non-printable area on which printing cannot be performed is created, generating, based on an amount of displacement of the print head toward the second direction and an area on which printing is performed in a case where the print head is not inclined toward the second direction, corrected print data according to the amount of displacement. The print head performs printing on a printing target, and the second direction intersects with the first direction.

12 Claims, 11 Drawing Sheets

(56) References Cited

U.S. PATENT DOCUMENTS

2024/0316964 A1* 9/2024 Tanase .................... B41J 25/001

FOREIGN PATENT DOCUMENTS

| | | | | |
|---|---|---|---|---|
| JP | 2009-006676 | A | | 1/2009 |
| JP | 2010-143026 | A | | 7/2010 |
| JP | 2014-148057 | A | | 8/2014 |
| JP | 2016068462 | A | * | 5/2016 |

OTHER PUBLICATIONS

JPO; Application No. 2022-025282; Notice of Reasons for Refusal dated Sep. 19, 2023.

* cited by examiner

FIRST PASS
SECOND PASS
THIRD PASS
FOURTH PASS
FIRST UNIT AREA
SECOND UNIT AREA
THIRD UNIT AREA
FOURTH UNIT AREA
Pi
Pc
411
41
n1
n2
n3
n4
d1
d2
d3
Arn
X
Y, Ya

PRINTING CONTROL METHOD, PRINTING CONTROL DEVICE, AND STORAGE MEDIUM

REFERENCE TO RELATED APPLICATIONS

This application is based upon and claims the benefit of priority from Japanese Patent Application No. 2022-025282 filed on Feb. 22, 2022, the entire content of which is incorporated herein by reference.

TECHNICAL FIELD

The present disclosure relates to a printing control method, a printing control device, and a storage medium.

DESCRIPTION OF RELATED ART

There has been known a printing device (nail printing device) that prints a design on the nail of a finger or the like. This type of printing device performs a printing process using an inkjet print head, for example.

Although the normal installation state of the print head is a state in which the print head is movable in a direction perpendicular to the left-right direction (main-scanning direction) with respect to the front of the printing device, the print head may be inclined from this normal installation state due to errors in designing or assembling, external shocks, or the like.

If the print head performs printing in the state of being inclined, ink landing positions deviate from their originally planned positions, so that high-quality printing results cannot be obtained.

In particular, in a case where the print head performs printing by a multi-pass method, by which printing on each area is performed by multiple passes, images printed by respective passes have positional difference, so that decrease in quality of printing is significant.

In this regard, for example, in JP 2004-017464 A, there is disclosed a printing device ("inkjet recording device" in JP 2004-017464 A) including a print head and a controller, wherein if a carrying direction (i.e., sub-scanning direction) of a printing target (recording matter, recording paper) is not parallel to a nozzle arrangement direction of nozzles provided in the print head, the controller corrects image data based on a correction value and controls operation of the print head so as to correct inclination of a pixel array formed by ink ejected from openings of the nozzles.

Such data correction makes it possible to correct displacement of the nozzle arrangement direction in the print head.

SUMMARY OF THE INVENTION

A printing control method of the present disclosure includes, in a case where a print head that performs printing on a printing target is inclined from a state parallel to a first direction toward a second direction intersecting with the first direction, and a non-printable area on which printing cannot be performed is created, generating, based on an amount of displacement of the print head toward the second direction and an area on which printing is performed in a case where the print head is not inclined toward the second direction, corrected print data according to the amount of displacement.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

Referring to FIG. 1 to FIG. 19B, one or more embodiments of a printing control method, a printing control device and a storage medium storing a program according to the present disclosure will be described.

Although various limitations technically preferable for carrying out the present disclosure are put on the embodiment(s) described below, the technical scope of the present disclosure is not limited to the embodiment(s) below or illustrated examples.

For example, in the following embodiment(s), as the printing control device, there is described a control device (control unit) that controls a printing device (nail printing device) that performs printing on fingernails of hands as the printing target. However, the control target of the printing control device of the present disclosure is not limited to the printing device that treats fingernails of hands as the printing target, but may be a printing device that treats toenails of feet as the printing target. Further, the printing device may be a printing device that treats, as the printing target, not even nails but surfaces of nail chips, various accessories, or the like.

Figure 1:
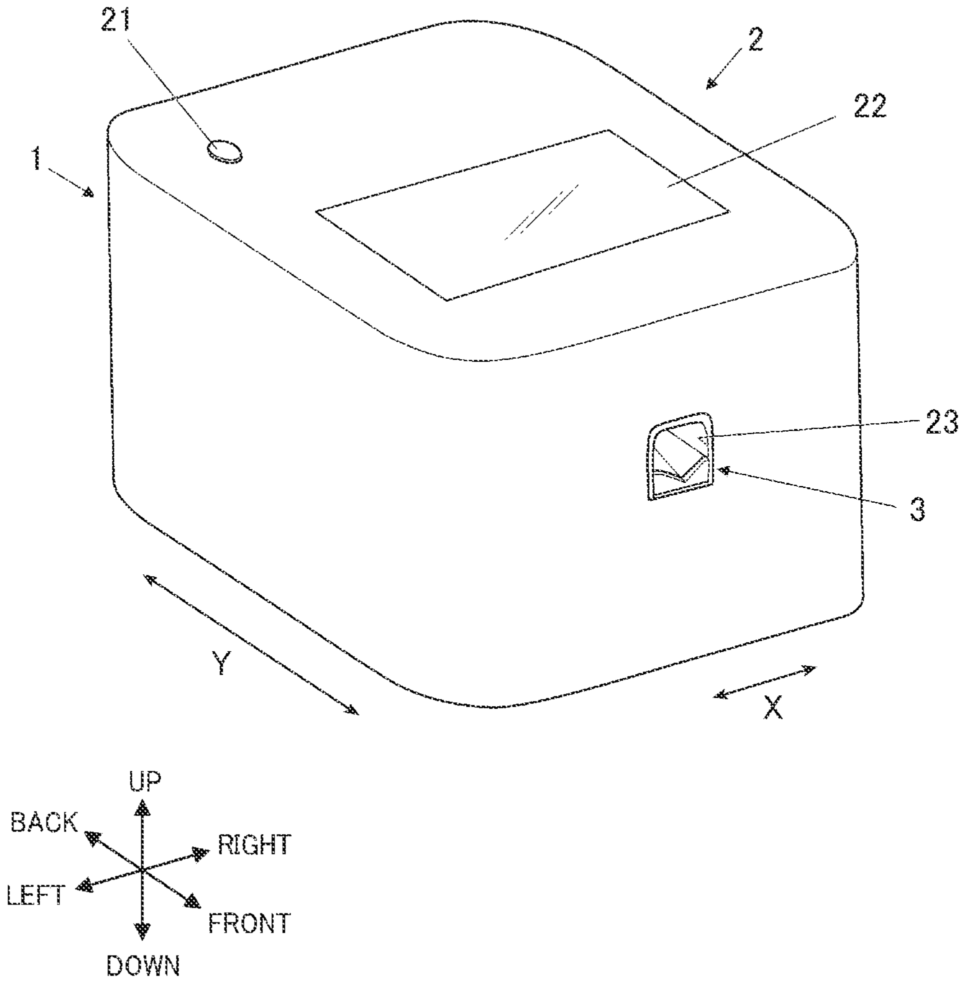
FIG. 1 is a perspective view of a printing device according to an embodiment(s), schematically showing its external configuration.

FIG. 1 is a perspective view of a printing device (nail printing device) of an embodiment(s), schematically showing its external configuration.

In the following embodiment(s), up, down, left, right, front and back or similar expressions refer to directions/orientations shown in FIG. 1. Also, X direction is the left-right direction shown in FIG. 1 and is referred to as a second direction in this embodiment, and Y direction is the front-back direction shown in FIG. 1 and is referred to as a first direction in this embodiment. The second direction is a direction that intersects with the first direction, and in this embodiment, the main-scanning direction X (second direction) is perpendicular to the sub-scanning direction Y (first direction).

As shown in FIG. 1, a printing device 1 has an approximately box-shaped case 2.

On the upper surface (top plate) of the case 2, an operation unit 21 and a display 22 are disposed.

Shapes and arrangement of the components of the case 2 are not limited to those shown in FIG. 1, but may be set appropriately. For example, the operation unit 21 and the display 22 may be disposed not on the upper surface of the case 2 but on the side surface, the back surface or the like of the case 2. Further, although FIG. 1 shows the operation unit 21 made up of one button, the operation unit 21 may be made up of a plurality of buttons disposed on the upper surface or the like of the case 2. The case 2 may further has an indicator or the like.

The operation unit 21 is for a user to make various inputs.

The operation unit 21 is, for example, an operation button, such as a power switch button to turn on and off a power source of the printing device 1.

When the operation unit 21 is operated by the user, an operation signal corresponding to the operation is output to a controller 11, and the controller 11 performs control in accordance with the operation signal, thereby operating the components of the printing device 1. For example, if the operation unit 21 is a power switch button, the printing device 1 is powered on or off in response to a user operation on the button.

In this embodiment, the printing device 1 cooperates with, for example, a terminal device 8 (shown in FIG. 2) described later. Hence, the components of the printing device 1 may be operated in accordance with an operation signal input from not the operation unit 21 but an operation unit 83 (shown in FIG. 2) of the terminal device 8.

The display 22 is, for example, a liquid crystal display (LCD), an organic electroluminescent display or another flat display.

The surface of the display 22 may be integrated with a touchscreen for the user to make various inputs. In this case, the touchscreen functions as the operation unit 21.

The display 22 may display a nail design input/selected by the user through the operation unit 21 or the like, a nail image generated by imaging a nail of the user, and so forth.

The display 22 may also display a message screen or the like where an instruction(s), guidance, a warning(s) or the like for the user is displayed.

At approximately the center in the left-right direction (X direction in FIG. 1) of the front surface of the case 2 of the printing device 1 (on the front/near side in the Y direction in FIG. 1), a finger insertion port 23 is formed. The finger insertion port 23 is an opening into which a finger is inserted when printing is performed by the printing device 1.

The case 2 houses a finger placement unit 3, a printing mechanism 4 (shown in FIG. 2), an imager 5 (shown FIG. 2) and so forth, which constitute the body of the printing device 1.

The finger placement unit 3 is disposed in the case 2 at a position corresponding to the finger insertion port 23.

The finger placement unit 3 has an opening corresponding to the finger insertion port 23. The finger, the nail of which is the printing target, inserted through the finger insertion port 23 is further inserted through the opening and held at a position in the finger placement unit 3 suitable for printing.

The upper surface of the finger placement unit 3 is opened to form a window that exposes the nail of the finger placed in the finger placement unit 3.

Figure 2:
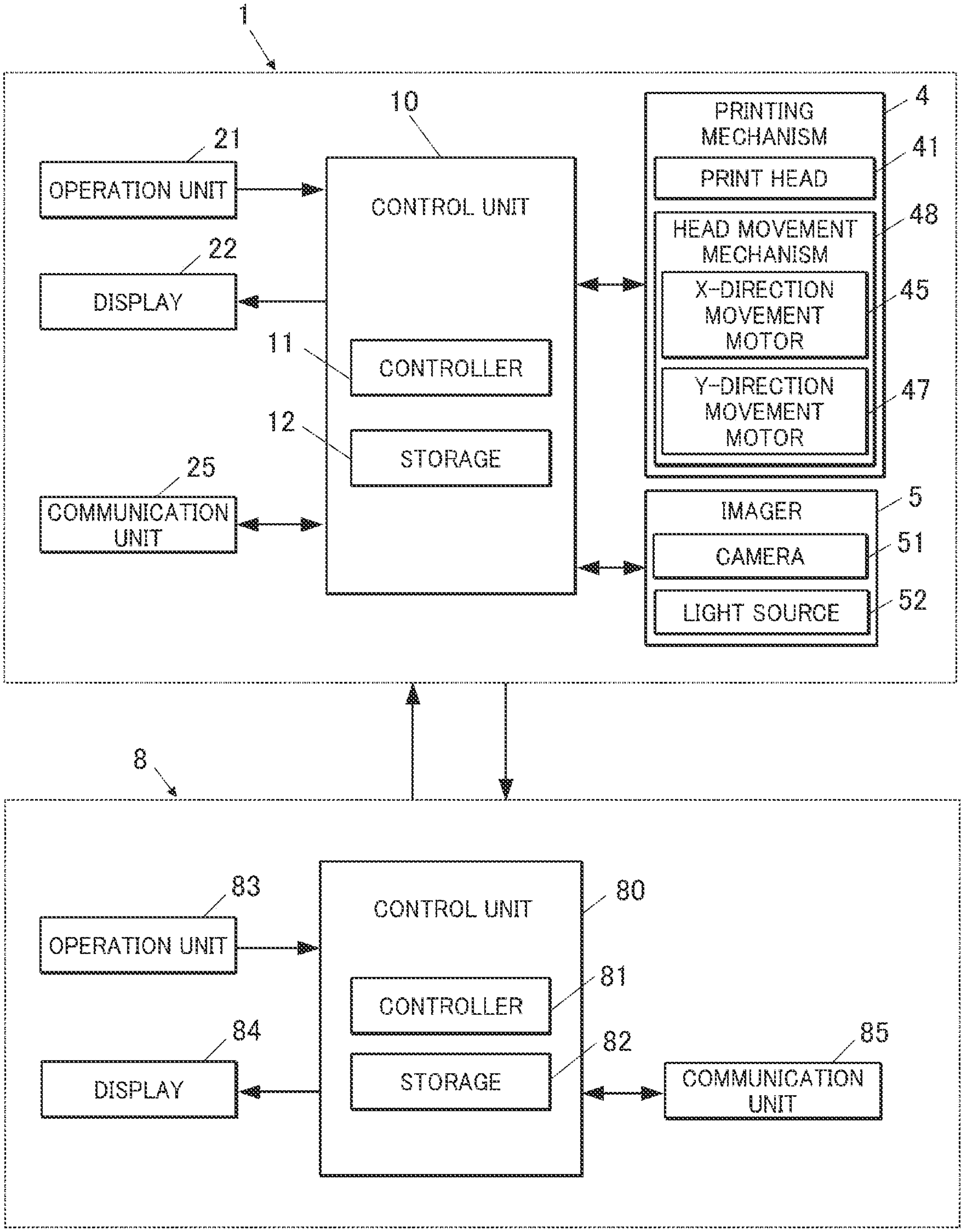
FIG. 2 is a block diagram schematically showing the control configuration of the printing device and a terminal device that cooperates with the printing device in the embodiment.

FIG. 2 is a block diagram schematically showing the control configuration of the printing device 1 and the terminal device 8 that cooperates with the printing device 1.

As shown in FIG. 2, the printing mechanism 4 includes the print head 41 and a head movement mechanism 48 that moves the print head 41.

In this embodiment, the printing mechanism 4 performs printing with the print head 41 on the nail of a finger or the like, which is the printing target.

The print head 41 of this embodiment is an inkjet head that (i) has a surface that faces the printing target surface (surface of a nail), the surface being configured as an ink ejection surface provided with a plurality of nozzle ports to eject ink, and (ii) produces fine droplets of ink and directly sprays the ink from the ink ejection surface to the printing target surface, thereby performing printing. The print head 41 is not particularly limited in configuration, but may be a cartridge-integrated head in which an ejection mechanism, such as the ink ejection surface, and an ink cartridge, where ink is stored, are integrated, for example.

The print head 41 can eject color inks, such as cyan (C), magenta (M) and yellow (Y) inks. The print head 41 may also be able to eject an ink for undercoating, such as white ink, as a paint for forming a base. The type of ink provided in the print head 41 is not limited thereto.

The head movement mechanism 48 has an X-direction movement mechanism that moves the print head 41 in the left-right direction (X direction) of the printing device 1 and a Y-direction movement mechanism that moves the print head 41 in the front-back direction (Y direction) of the printing device 1.

The X-direction movement mechanism includes an X-direction movement motor 45 (shown in FIG. 2). The X-direction movement motor 45 is driven, thereby moving the print head 41 in the left-right direction (X direction) of the printing device 1. The Y-direction movement mechanism includes a Y-direction movement motor 47 (shown in FIG. 2). The Y-direction movement motor 47 is driven, thereby moving the print head 41 in the front-back direction (Y direction) of the printing device 1. The X-direction movement motor 45 and the Y-direction movement motor 47 are stepping motors, for example.

As mentioned above, in this embodiment, the left-right direction (X direction) of the printing device 1 is the main-scanning direction, and a direction perpendicular to this main-scanning direction, namely the front-back direction (Y direction) of the printing device 1, is the sub-scanning direction.

Hereinafter, the configuration of the print head 41 of the printing mechanism 4 will be described in detail.

Figure 3:
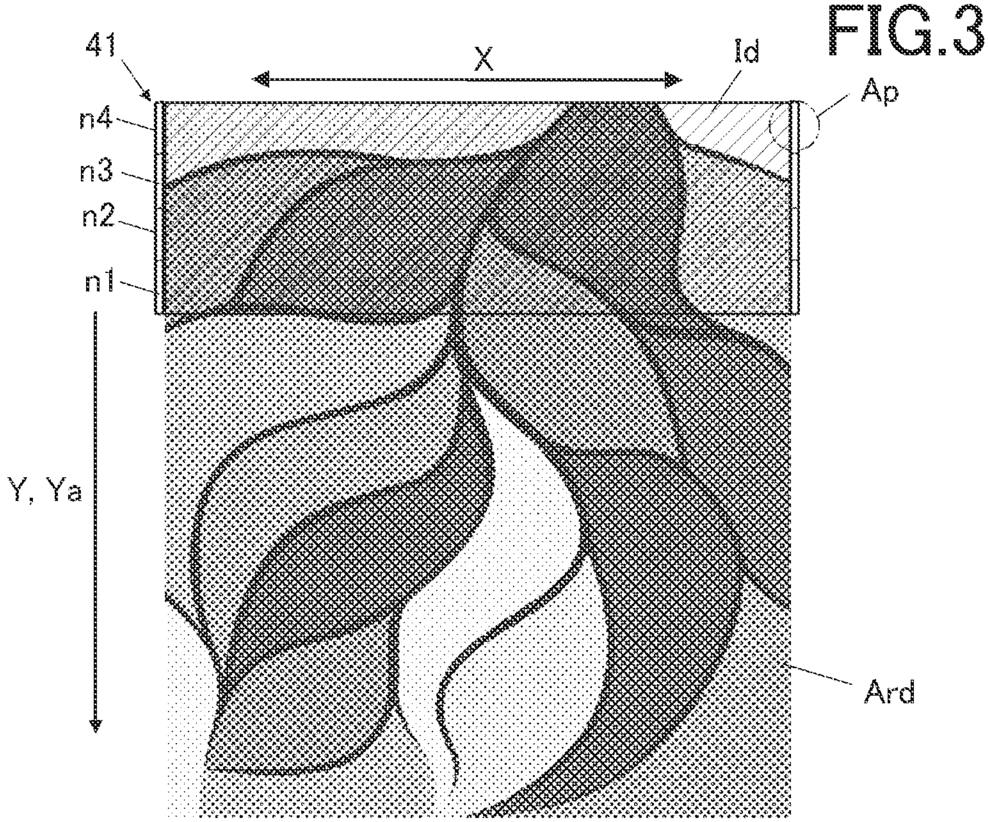
FIG. 3 is a plan view showing an example of print data in a case where a print head is not inclined.

FIG. 3 schematically shows that the print head 41 of this embodiment prints a design. In FIG. 3 or the like, a printing area for a design that is, in practice, fitted to the shape of a nail is represented by a rectangle for convenience' sake.

FIG. 3 shows the normal state of the print head 41, in which the print head 41 is not inclined, and a rectangular hatched part in the FIG. 3 represents print data Id of a design for an area having a width equal to the length of the print head 41 in the lengthwise direction of the print head 41. In FIG. 3 or the like, a printing area for the entire design is referred to as a printing area Ard.

The print head 41 has a nozzle line 411 (schematically shown in FIG. 5) made up of a plurality of nozzles arranged in line along the lengthwise direction. In the normal state, in which the print head 41 is not inclined, as shown in FIG. 3, the lengthwise direction of the print head 41 (nozzle line direction of the nozzle line 411) is parallel to a sub-scanning direction Y (first direction) that is perpendicular to a main-scanning direction X (second direction).

The printing mechanism 4 of this embodiment performs printing by a multi-pass method (multi-pass printing), by which printing on an (each) area (unit area) is performed by/during multiple (n) passes (i.e., scans in the main-scanning direction X).

The print head 41 performs printing while moving in the main-scanning direction X. Once the print head 41 moves from one end to the other end of its movable area in the main-scanning direction X, the print head 41 moves a certain distance (e.g., ¼ of the head length (nozzle line length) if the print head 41 performs printing on each unit area by four passes) in the sub-scanning direction Y (forward direction Ya of the sub-scanning direction Y), and performs printing again while moving in the main-scanning direction X (e.g., in the opposite direction to that of the immediately-before pass, i.e., from the other end to the one end of the movable area).

In this case, first nozzles (nozzle group n1) to nth nozzles (nozzle group nn) are in charge of (i.e., responsible for) printing during the first pass to printing during the nth pass, respectively.

For example, in a case where the print head 41 performs printing on each unit area by four passes, since the nozzle line 411 of the print head 41 is, as shown in FIG. 3 or the like, made up of first nozzles (nozzle group) n1, second nozzles (nozzle group) n2, third nozzles (nozzle group) n3 and fourth nozzles (nozzle group) n4 arranged in this order from the downstream side in the forward direction Ya of the sub-scanning direction Y, the print head 41 performs printing during the first pass with the first nozzle group n1 on each unit area, performs printing during the second pass with the second nozzle group n2 on the unit area, and so forth. That is, the nozzle groups perform printings of their respectively responsible passes.

The printing device 1 recognizes the position and shape of the printing target (nail in this embodiment) from an image obtained by the camera 51, which is described later, imaging the printing target. The printing device 1 aligns camera coordinates of the camera 51 and printing coordinates of the print head 41, which performs printing, with one another, and performs printing so as to fit the shape of the printing target (nail in this embodiment).

As shown in FIG. 3, alignment of the camera coordinates and the printing coordinates are performed at the position of the end of the print head 41 on the upstream side in the forward direction Ya (alignment position Ap enclosed by a dash-dot-dash line in FIG. 3).

As described later, the imager 5 is fixed at a position where the imager 5 can image the nail of a finger or the like placed in the finger placement unit 3. Hence, axes of the imager 5 in the X, Y directions themselves are not displaced with respect to the printing device 1.

Figure 4:
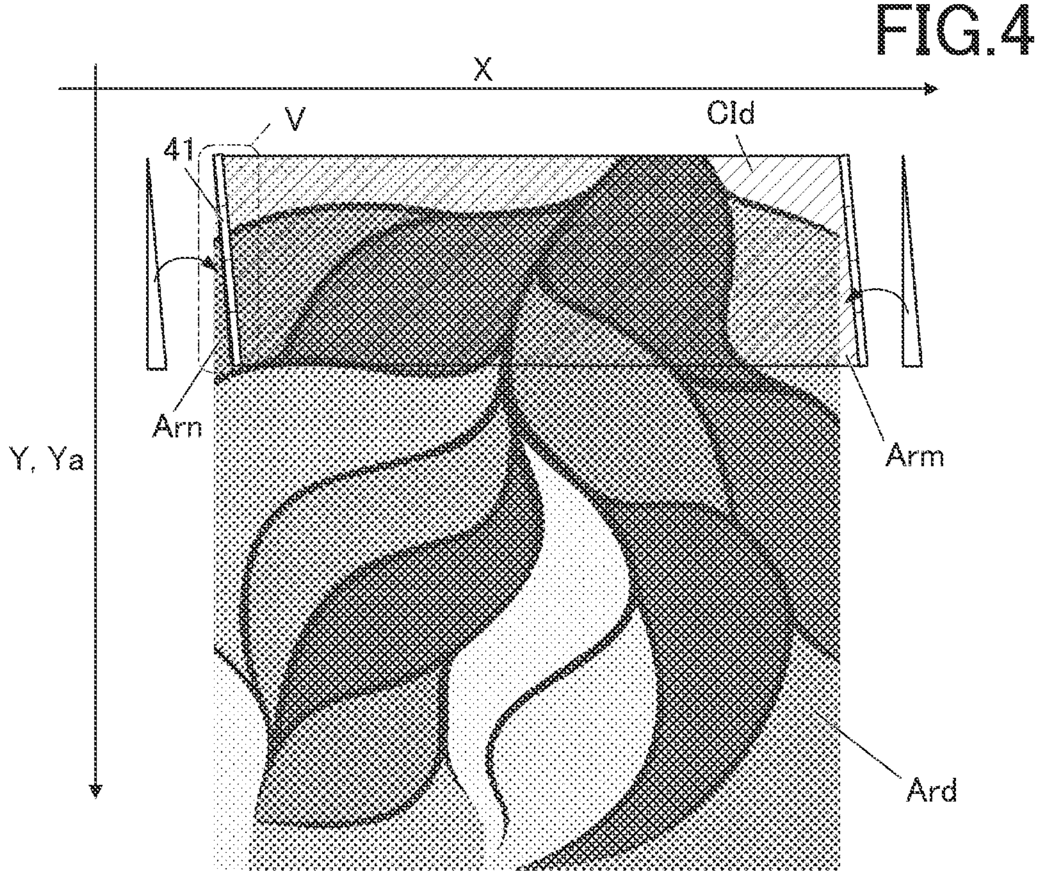
FIG. 4 is a plan view showing an example of inclination-correction-subjected data generated by performing inclination correction on the print data in a case where the print head is inclined.

FIG. 4 illustrates that the print head 41 that is about to print the same design as that shown in FIG. 3 is inclined toward the main-scanning direction X from the sub-scanning direction Y.

As shown in FIG. 4, since the print head 41 is inclined to right in the main-scanning direction X, when the print head 41 is about to start printing from a position on the left side in FIG. 4, the leading side (lower side in FIG. 4) of the print head 41 in the forward direction Ya is already inside the printing area Ard.

For this reason, the print data Id is subjected to inclination correction according to the inclination of the print head 41, thereby being inclination-correction-subjected data CId, which is inclined as shown in FIG. 4, and printing is performed based on this inclination-correction-subjected data CId.

However, if printing is performed using such inclination-correction-subjected data CId, a triangular area shown at the left end in FIG. 4 remains, from the perspective of data, no-printed, or remains, from the perspective of the printing target surface, unpainted (no-ink-landing). Such an area is referred to as a non-printable area Arn. It is noted that the abovementioned perspectives are applicable to the other "area(s)" in the present disclosure.

Figure 5:
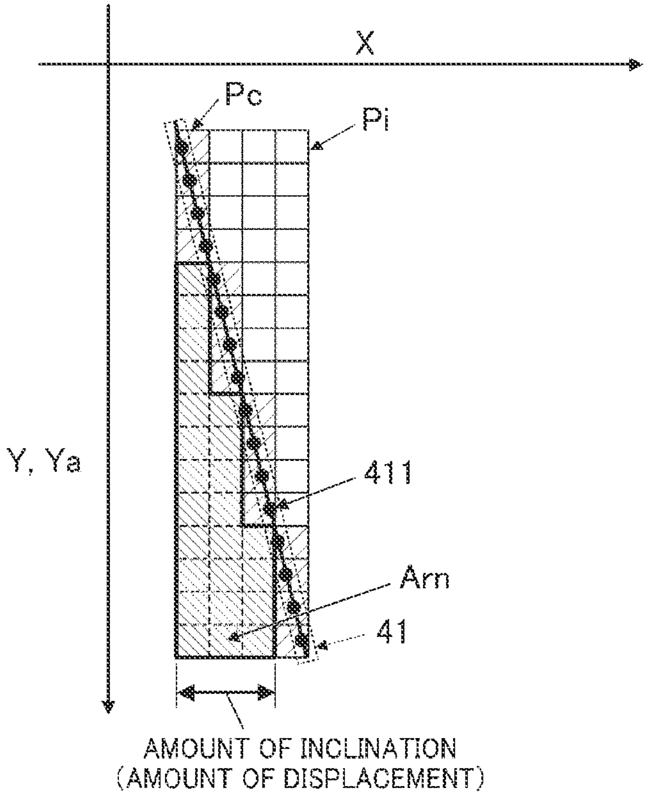
FIG. 5 illustrates printing with the inclined print head.

FIG. 5 shows a relationship between print data and the print head 41 (nozzle line 411 of the print head 41) that create a non-printable area Arn. FIG. 5 is a schematic illustration in which a frame V enclosed by a dash-dot-dash line in FIG. 4 is zoomed up to the pixel level.

In FIG. 5, each square represents one pixel Pi. In FIG. 5, as indicated by a broken line, the print head 41 is inclined, and the nozzle line 411 is inclined accordingly. That is, for the amount of inclination of the print head 41, a line formed by connecting the position of the end of the print head 41 on the upstream side in the forward direction Ya, at which the abovementioned alignment is performed, and the position of the end of the print head 41 on the downstream side in the forward direction Ya is displaced from the state parallel to the sub-scanning direction Y. In FIG. 5, the downstream side of the print head 41 is located right in the main-scanning direction X in relation to the upstream side thereof.

Among the pixels Pi, pixels Pi selected as to correspond to the inclined print head 41, namely from the perspective of data, pixels Pi that can be printed, or from the perspective of the printing target surface, pixels Pi on which ink can land, are indicated by rough hatching as selected pixels Pc since corresponding nozzles are present. It is noted that the abovementioned perspectives are applicable to the other "pixel(s)" in the present disclosure.

The selected pixels Pc, which correspond to the nozzle line 411, can be printed correctly even if the print head 41 is inclined as shown in FIG. 5.

In contrast, pixels Pi indicated by fine hatching cannot be printed although data is present indicating that they include pixels Pi to be printed, because nozzles in charge of their printing do not correspond to them in position. That is, these pixels Pi constitute a non-printable area Arn where printing is unperformable.

Figure 6:
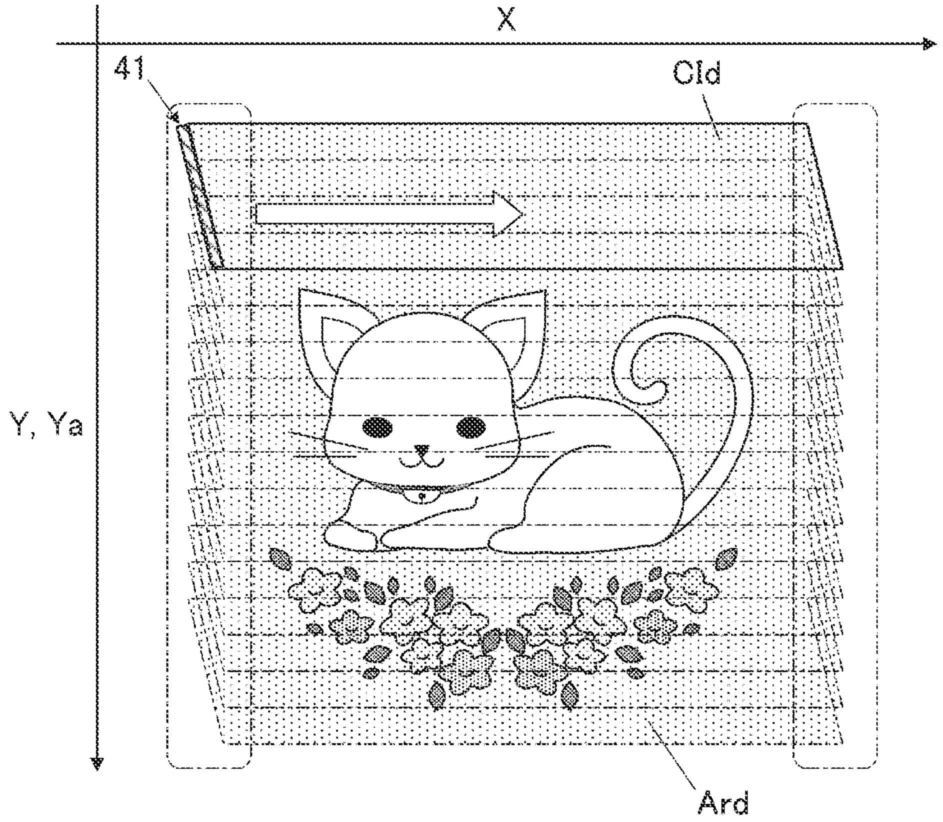
FIG. 6 shows a result of printing with the inclined print head.

Meanwhile, at the right end in FIG. 4, a triangular area is printed outside the printing area Ard. Such an area is referred to as an excessive area Arm. As a result, as shown in FIG. 6, both edges of a printed image in the main-scanning direction X (parts enclosed by dash-dot-dash lines in FIG. 6) do not form straight lines but are irregular, and the printed image may be light thereat.

In this embodiment, the print data Id is subjected to inclination correction, thereby being inclination-correction-subjected data CId, and a method is used for, if not preventing, reducing irregularities of a printed image that appear at its edges in the main-scanning direction X if printing using the inclination-correction-subjected data Cid is performed by the inclined print head 41.

Specific contents of the method will be described later.

The imager 5 is fixed at a position that is on the inner side of the upper surface (top panel) of the case 2 and above the window of the finger placement unit 3. The imager 5 images the nail (finger including the nail) exposed through the window, thereby obtaining an image thereof.

The imager 5 includes a camera 51 and a light source 52 (shown in FIG. 2). The camera 51 is, for example, a small-sized camera that includes a solid state image sensor, such as a CCD (Charge Coupled Device) image sensor or a CMOS (Complementary Metal Oxide Semiconductor) image sensor, having two million pixels or more, and a lens. The light source 52 is, for example, a white LED that illuminates an imaging target (i.e., printing target).

The imager 5 is not particularly limited in its specific position, but, in this embodiment, disposed and fixed at a position where it can image the nail of a finger placed in the finger placement unit 3 or the like. The imager 5 may be movable in the X, Y directions by the head movement mechanism 48 that moves the print head 41. In this case, the camera coordinates of the camera 51 and the printing coordinates of the print head 41, which performs printing, are aligned individually, for example.

As shown in FIG. 2, the printing device 1 includes, in addition to the abovementioned printing mechanism 4 and imager 5, a communication unit 25 and a control unit 10.

The communication unit 25 can transmit and receive information to and from the terminal device 8 that operates in cooperation with the printing device 1.

Communication between the printing device 1 and the terminal device 8 is performed, for example, by a wireless LAN. The communication between the printing device 1 and the terminal device 8 is not limited thereto, but may be performed by another system. For example, the communication may use a network line, such as the Internet, or may be wireless communication based on a short-range wireless communication standard, such as Bluetooth® or Wi-Fi. This communication is not even limited to wireless communication. The communication unit 25 may be configured to transmit and receive various data to and from the terminal device 8 by wired connection. The communication unit 25 includes an antenna chip and/or the like that agrees with the communication system of the terminal device 8.

The control unit 10 included in the printing device 1 is a computer as the printing control device that includes: a controller 11 including at least one processor, such as a central processing unit (CPU); and a storage 12 including, as at least one memory, a read only memory (ROM) and a random access memory (RAM).

The storage 12 stores various programs, various data and so forth that cause the printing device 1 to operate.

More specifically, the ROM or the like of the storage 12 stores various programs, such as a printing control program(s) for various printing control processes. The controller 11 loads these programs to a working area of the RAM and executes same, thereby performing overall control of the components of the printing device 1.

The controller 11 controls operation of the printing mechanism 4. Further, the controller 11 controls operation of the imager 5. Still further, the controller 11 controls display of the display 22 and controls the communication unit 25. Yet further, the controller 11 obtains the amount of displacement (described later) and corrects print data. The CPU of the controller 11 performs these functions by working together with the programs stored in the ROM of the storage 12.

If the print head 41 is inclined from the state parallel to the sub-scanning direction Y, which is the first direction, toward the main-scanning direction X, which is the second direction intersecting with the first direction, the controller 11 obtains the amount of displacement (amount of inclination) of the print head 41 toward the second direction.

The amount of displacement (amount of inclination) is obtained, for example, by printing in advance a test chart for obtaining a correction value, and stored in the storage 12 or the like. The controller 11 reads the amount of displacement (amount of inclination) from the storage 12 or the like, and obtains and sets same as a correction value (correction information) to be used in printing.

Further, the controller 11 controls the components of the printing mechanism 4, such as the print head 41, and the X-direction movement motor 45 and the Y-direction movement motor 47 included in the head movement mechanism 48.

Further, in embodiment, the controller 11 this generates print data Id for the print head 41 to print a design (nail design) in the printing area Ard. For example, the controller 11 detects a nail contour defining an area of a nail (nail area) by processing a nail image obtained by the camera 51 imaging the nail of a finger placed in the finger placement unit 3, and generates print data Id by fitting a user's desired/selected design into the nail area inside the nail contour. More specifically, the controller 11 cuts out image data of a design (nail design) and performs scaling, positional adjustment and/or the like thereon as appropriate, and fits same into the nail area inside the nail contour detected from a nail image obtained. The controller 11 also assigns blank pixels Pb to pixels outside the nail contour, thereby generating rectangular print data as a whole. In this embodiment, for the sake of clear explanation, blank pixels Pb are only assigned to pixels outside the nail contour.

If curvature of a nail or the like is obtained from a nail image or the like, the controller 11 may perform, based on the curvature of the nail or the like, various types of correction on print data as appropriate, such as curved surface correction. Curved surface correction or the like can generate print data more fitted to the shape of a nail.

Further, in this embodiment, the controller 11 corrects print data based on the amount of displacement (amount of inclination) obtained by itself.

That is, the controller 11 obtains the amount of displacement (amount of inclination) of the print head 41, and based on this amount of displacement (amount of inclination) of the print head 41 and an area on which printing is performed if the print head 41 is not inclined, generates corrected print data according to the amount of displacement (amount of inclination), if an area on which printing cannot be performed (non-printable area Arn detailed below) is created.

More specifically, first, the controller 11 generates inclination-correction-subjected data CId corresponding to the amount of inclination of the print head 41. Then, the controller 11 controls the components of the printing mechanism 4 to perform printing using this inclination-correction-subjected data CId.

In order to generate inclination-correction-subjected data CId, for example, the controller 11 performs, as described above, inclination correction according to the inclination of the print head 41, thereby generating inclined inclination-correction-subjected data CId (shown in FIG. 4).

Further, in this embodiment, the controller 11 generates corrected print data for reducing irregularities of a printed image that appear at its edges in the main-scanning direction X if printing using the inclination-correction-subjected data Cid is performed.

In this embodiment, as a correction method for reducing irregularities of a printed image that appear at its edges in the main-scanning direction X, a first method and a second method are prepared.

A method to use, the first method or the second method, may be determined by default, or may be chosen/set appropriately by the user. Alternatively, the controller 11 may choose one of the methods suitable for the type of design, the amount of displacement (degree of inclination) of the print head 41 or the like.

Although in this embodiment, the first method and the second method are prepared to be chosen to use, only one of the first method and the second method may be prepared to use.

Details of the first method and the second method will be described later.

As described above, the printing device 1 of this embodiment can communicate with the terminal device 8, and therefore performs printing and so forth in accordance with operation commands from the terminal device 8.

The terminal device 8 of this embodiment is, for example, a portable terminal, such as a smartphone or a tablet. However, the terminal device 8 is not particularly limited as far as it can communicate with the printing device 1. Examples thereof include a laptop PC, a stationary PC, and a terminal device for gaming.

As shown in FIG. 2, the terminal device 8 includes the abovementioned operation unit 83, a display 84, a communication unit 85 and a control unit 80.

The operation unit 83 is configured to make/do various inputs/settings or the like in response to user operations. When the operation unit 83 is operated by the user, an input signal corresponding to the operation is transmitted to the control unit 80. In this embodiment, the surface of the display 84 may be integrated with a touchscreen for the user to make operations for various inputs/settings or the like by touch operations thereon.

The operation unit 83 for various inputs/settings or the like is not limited to the touchscreen. For example, the operation unit 83 may include various operation buttons, a keyboard, a pointing device and/or the like.

In this embodiment, the user can select a nail design to be printed on a nail by operating the operation unit 83, for example.

The touchscreen configured on the display 84 displays various display screens under the control of a controller 81 described later.

The display 84 can also display a nail design input/selected by the user through the operation unit 83, an image transmitted from the printing device 1, and so forth.

The communication unit 85 can transmit print data to the printing device 1. Also, the communication unit 85 receives data of a nail image or the like transmitted from the printing device 1. The communication unit 85 includes a wireless communication module or the like capable of communicating with the communication unit 25 of the printing device 1.

The communication unit 85 may be any type as far as it can communicate with the printing device 1, namely agrees with the communication standard of the communication unit 25 of the printing device 1.

The control unit 80 is a computer that includes: the controller 81 including a central processing unit (CPU); and a storage 82 including a read only memory (ROM) and a random access memory (RAM).

The controller 81 performs overall control of the components of the terminal device 8. The controller 81 performs various functions by working together with programs stored in the storage 82.

The storage 82 stores various programs, various data and so forth that cause the components of the terminal device 8 to operate.

More specifically, the storage 82 of this embodiment stores various programs, such as an operating program for performing overall control of the components of the terminal device 8 and a nail printing application program for performing nail printing with the printing device 1. The control unit 80 loads these programs, for example, to a working area of the storage 82 and executes same, thereby controlling the terminal device 8.

The storage 82 of this embodiment also stores various design data (data of nail designs).

Next, a printing control method of the printing device 1 will be described with reference to the drawings.

When the printing device 1 and the terminal device 8 that cooperates with the printing device 1 are powered on, the nail printing application program of the terminal device 8 starts.

This causes, for example, the display 22 of the printing device 1 and/or the display 84 of the terminal device 8 to display a message to urge the user to set a nail. If the printing device 1 or the terminal device 8 has an audio outputter, such as a speaker, the outputter may output audio guidance instead of or in addition to the display 22/84 displaying the message.

When guided so, the user sets his/her finger corresponding to the nail on which printing is desired to be performed in the finger placement unit 3.

When the finger corresponding to the nail is set, the controller 11 reads a correction value obtained in advance and corrects print data of a nail design.

In particular, in this embodiment, a correction value (correction information) for the amount of inclination of the print head 41 that is inclined from the state of being arranged perpendicular to the main-scanning direction X is stored in the storage 12 or the like in advance. The controller 11 corrects print data in accordance with this correction value, and then controls the printing mechanism 4 to cause the print head 41 to print the design (nail design) on the printing target, such as the nail.

Hereinafter, details of correction of print data according to the amount of inclination of the print head 41 will be described.

In this embodiment, as the correction method for correcting print data, two types of correction method (first method and second method) are usable.

First, the first method will be described. The first method is a method of, if an area on which printing cannot be performed (i.e., non-printable area Arn) is created by the inclination of the print head 41, generating corrected print data by extending print data by assigning blank pixels Pb that are not printed to an edge area of the print data such that all pixels Pi to be printed are located in a printable area.

Figure 7:
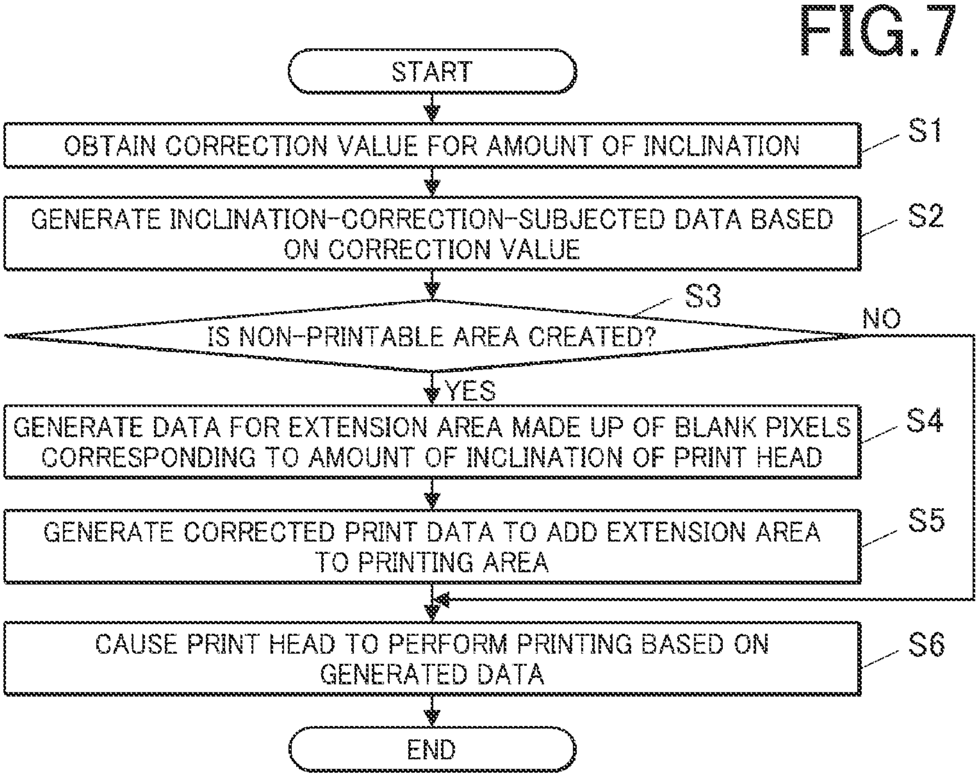
FIG. 7 is a flowchart of a first method of a print data correction method that is used in a case where the inclined print head performs printing.

FIG. 7 is a flowchart showing processes/steps of this first method.

In the first method, the controller 11 first obtains a correction value for the amount of inclination of the print head 41 (Step S1), and based on this correction value, performs inclination correction on print data Id, thereby generating inclination-correction-subjected data CId (Step S2). Then, the controller 11 determines whether a non-printable area Arn is created at an edge of the printing area Ard in the main-scanning direction X if printing is performed using this inclination-correction-subjected data CId (Step S3).

If the controller 11 determines that a non-printable area Arn is created (Step S3; YES), the controller 11 generates data for an extension area Are made up of pixels Pi (blank pixels Pb or lines of blank pixels Pb) corresponding to the amount of inclination of the print head 41, namely made up of pixels Pi for the width same as the maximum width (maximum number of pixels) of the non-printable area Arn in the main-scanning direction X (Step S4), and generates corrected print data to add the extension area Are to the edge of the printing area Ard (i.e., by adding the data for the extension area Are to the print data Id) (Step S5).

Then, the controller 11 causes the print head 41 to perform printing based on this corrected print data (Step S6), thereby performing printing on the printing area Ard extended/corrected by the pixels Pi corresponding to the amount of inclination of the print head 41 being added.

If the controller 11 determines that a non-printable area Arn is not created (Step S3; NO), the controller 11 causes the print head 41 to perform printing on the original printing area Ard based on the print data (inclination-correction-subjected data CId obtained by performing inclination correction on the print data Id).

Figure 8:
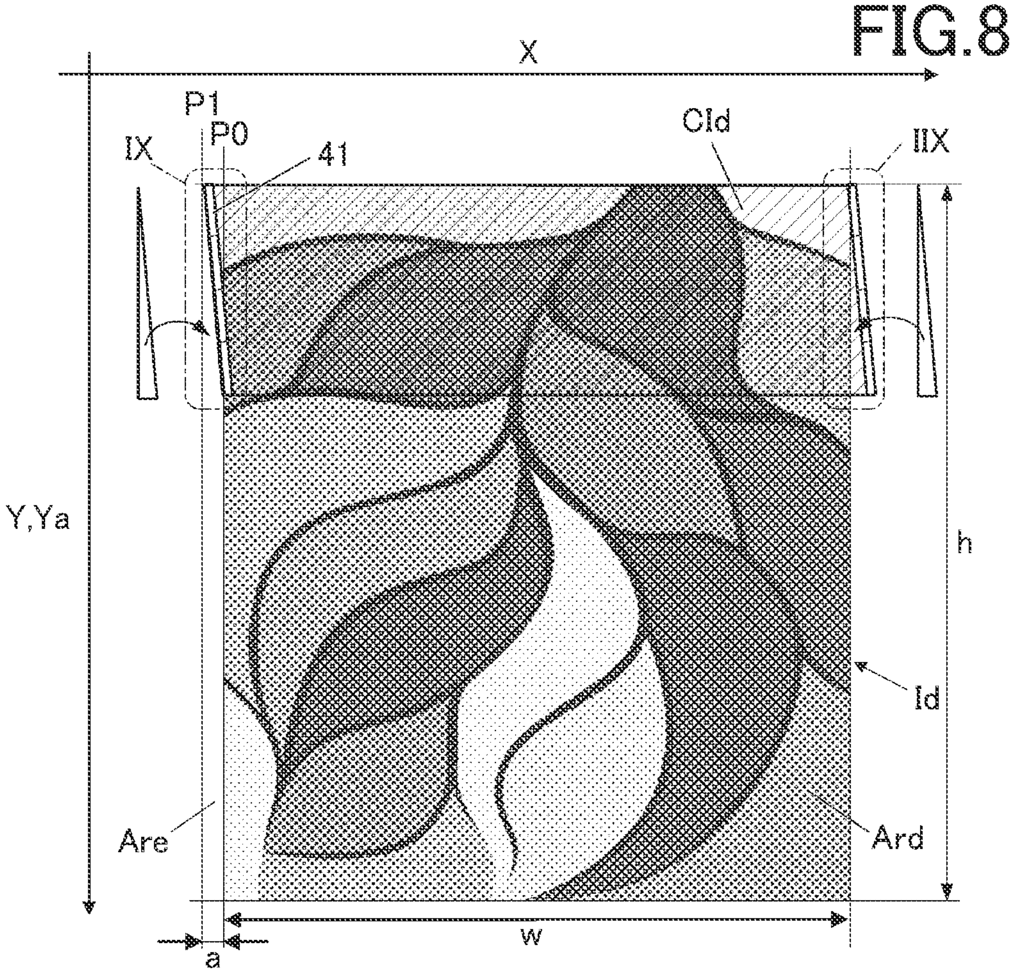
FIG. 8 illustrates the first method of the print data correction method.

FIG. 8 schematically shows a state in which, to the left of an area (printing area Ard) on which printing has been scheduled using print data before being corrected (inclination-correction-subjected data CId obtained by performing inclination correction on the print data Id), blank pixels Pb to extend print data Id (printing area Ard) are added. In FIG. 8, the area on which printing should be performed (printing area Ard before being corrected) is represented by a rectangle of "Width w×Height h (w>0, h>0)" in X, Y printing coordinates, and a position (coordinates) at the upper left of the area is represented by P0(X0,Y0). The coordinates of the position P0 are the coordinates of the printing start position (printing reference point) before the correction.

An area having a width a (a>0) extended from the original printing area Ard by adding pixels Pi to the left of the area Ard on which printing should be performed is the extension area Are, and a position (coordinates) at the upper left of an area formed of the printing area Ard with the extension area Are added is represented by P1(X0-a,Y0).

Figure 9:
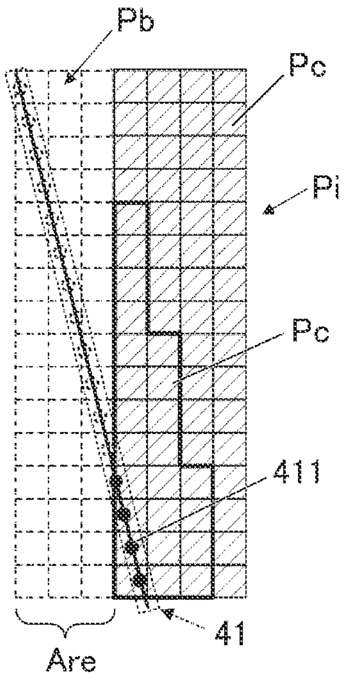
FIG. 9 is a schematic illustration in which blank pixels are added to an edge on a side where a non-printable area is created.

FIG. 9 is a schematic illustration in which a frame IX enclosed by a dash-dot-dash line in FIG. 8 is zoomed up to the pixel level.

In FIG. 9, as in FIG. 5, each square represents one pixel Pi.

As shown in FIG. 9, the extension area Are is an area to add pixels Pi for a width corresponding to the amount of inclination (amount of displacement) of the print head 41 to the printing area Ard.

As shown in FIG. 5, if the maximum amount of displacement in the main-scanning direction X is three pixels and the non-printable area Arn of up to three pixels in the main-scanning direction X is created accordingly, as shown in FIG. 9, the extension area Are made up of three lines (columns) of pixels Pi is added in order to extend the print data Id, so that an area of "Width w+a×Height h" is a corrected printing area Ard.

To this extension area Are, blank pixels Pb, which are not actually printed (i.e., on which printing is not actually performed), are assigned.

Blank pixels Pb (lines of blank pixels Pb corresponding to the extension area Are of "three pixels in the main-scanning direction X×Height h"), the number of which in the main-scanning direction X is the same as the maximum number of pixels in the main-scanning direction X (three pixels in the example shown in FIG. 5) of the amount of displacement toward the main-scanning direction X caused by the inclination of the print head 41, are added to the left of the print data Id to extend the printing area Ard, so that the non-printable area Arn does not exist any longer. Further, selected pixels Pc are assigned to the previous non-printable area Arn, so that printing can be performed on the entire area on which printing should be performed.

If the corrected print data is data generated by extending the print data Id, the corrected print data includes information to change the coordinate(s) of the printing start position (printing reference point).

That is, in the example shown in FIG. 8, the printing start position (printing reference point) is changed from P0(X0, Y0), which is the coordinates of the original printing start position, to P1(X0-a,Y0) in order to perform printing on the corrected printing area Ard.

Figure 10:
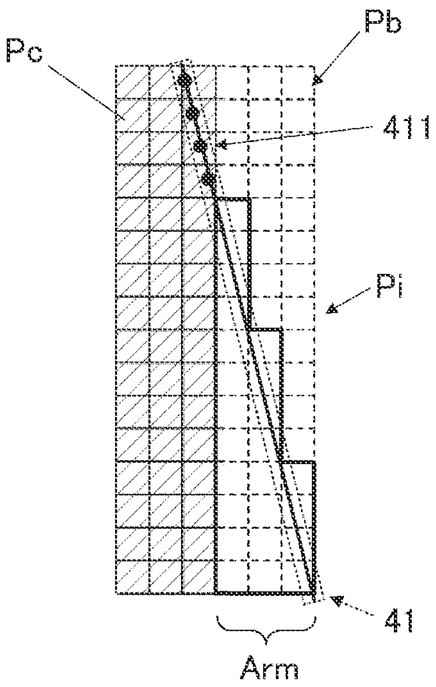
FIG. 10 is a schematic illustration in which blank pixels are added to an edge opposite to the edge where the non-printable area is created.

FIG. 10 is a schematic illustration in which a frame XII enclosed by a dash-dot-dash line in FIG. 8 is zoomed up to the pixel level, showing a part of the corrected print data for the right end of the print data Id.

As shown in FIG. 8, the print data (inclination-correction-subjected data CId obtained by performing inclination correction on the print data Id) protrudes to a part on which printing is not originally performed. This part is an edge area on a side opposite to the side (left side) where the non-printable area Arn is created and the extension area Are is added to extend the printing area Ard.

In this case, as shown in FIG. 10, blank pixels Pb, which are not printed, are assigned to the protrusion area, which is the excessive area Arm, according to the amount of inclination of the print head 41. That is, blank pixels Pb (lines of blank pixels Pb corresponding to the excessive area Arm of "three pixels in the main-scanning direction X×Height h"), the number of which in the main-scanning direction X is the same as the number of pixels in the main-scanning direction X of the extension area Are added to the left of the print data Id, are added to the right of the print data Id. This can prevent printing on the excessive area Arm, which is the same size as the extension area Are.

Depending on the position of the nozzle line 411 of the print head 41, selected pixels Pc may exceed the "Width w+a". In such a case, the added blank pixels Pb are treated as selected pixels Pc to be printed.

Next, the second method will be described. The second method is a method that is used in a case where the print head 41 performs printing by the multi-pass method, by which printing on each area (unit area) is performed by multiple passes from the first pass to the nth pass, and has the first nozzles to the nth nozzles that are in charge of (i.e., responsible for) printing during the first pass to printing during the nth pass, respectively. The second method is a method of generating corrected print data to cause nozzles as substitutes to perform printing on the non-printable area Arn where nozzles originally in charge of printing thereon cannot perform printing due the as the inclination of the print head 41, the nozzles a substitutes being in charge of printing during a pass(es) that is different from a pass(es) of the nozzles originally in charge.

FIG. 11A to FIG. 11D illustrate, in a case where printing on each area (unit area) is performed by the first pass to the fourth pass, nozzles that are in charge of respective passes.

As shown in FIG. 11A to FIG. 11D, in the abovementioned case, after performing printing during a pass, the print head 41 moves in the forward direction Ya of the sub-scanning direction Y a distance of ¼ of the length of the print head 41 (nozzle line 411 of the print head 41), and then performs printing during the next pass. As shown in FIG. 3 or the like, the nozzle line 411 of the print head 41 is made up of the first nozzles (nozzle group) n1, the second nozzles (nozzle group) n2, the third nozzles (nozzle group) n3 and the fourth nozzles (nozzle group) n4 arranged in this order from the downstream side in the forward direction Ya of the sub-scanning direction Y, and as indicated by broken lines in FIG. 11A to FIG. 11D, the width of each unit area coincides with ¼ of the length of the print head 41 (nozzle line 411 of the print head 41).

Figures 11A, 11B, 11C, 11D:
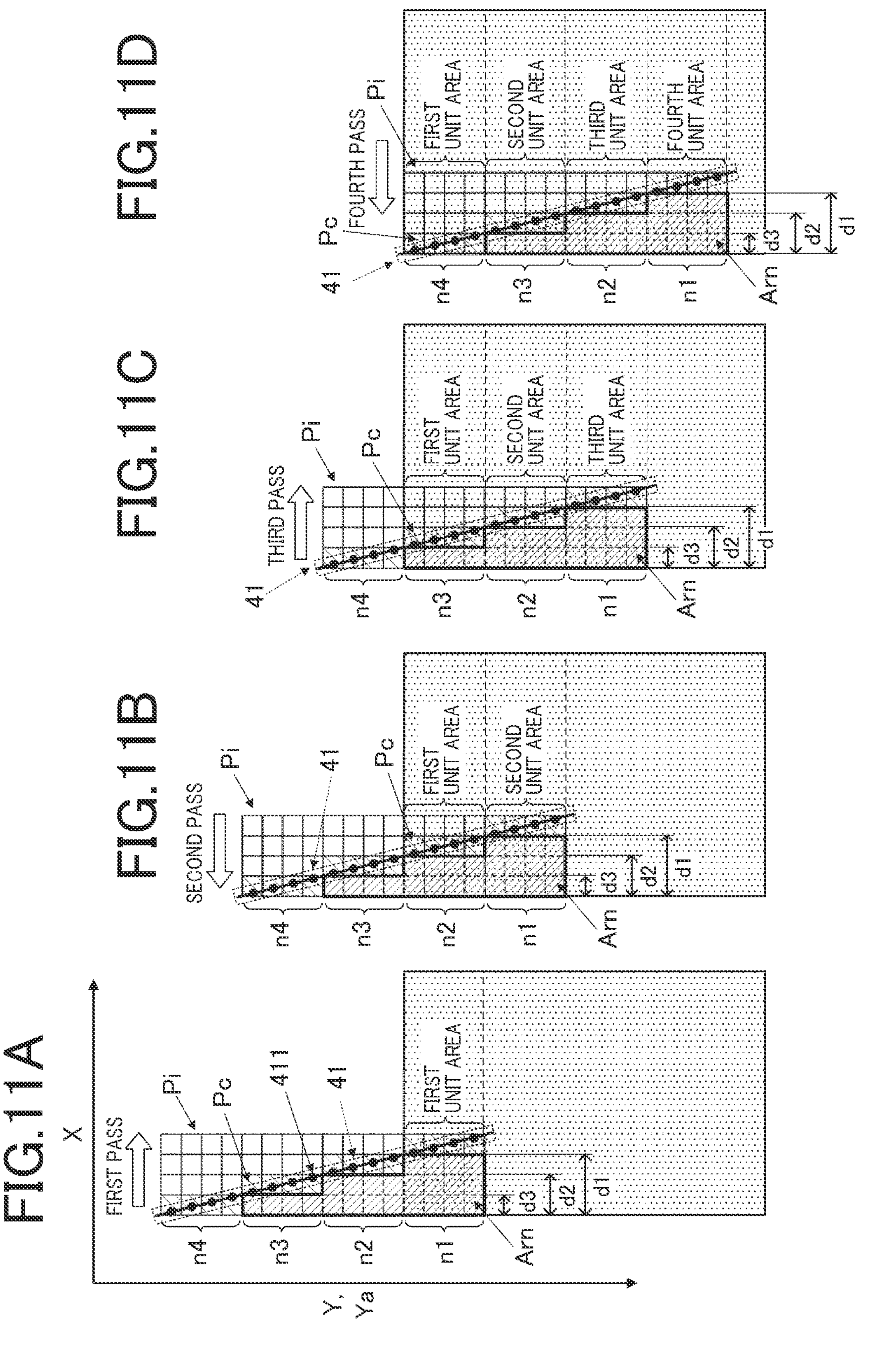
FIG. 11A is a schematic illustration showing the position of the print head in printing during the first pass of all passes to print a design.
FIG. 11B is a schematic illustration showing the position of the print head in printing during the second pass thereof.
FIG. 11C is a schematic illustration showing the position of the print head in printing during the third pass thereof.
FIG. 11D is a schematic illustration showing the position of the print head in printing during the fourth pass thereof.

FIG. 11A shows printing (printing start position of the print head 41) during the first pass on the first unit area.

As shown in FIG. 11A, the print head 41 performs printing during the first pass with the first nozzles n1 on the first unit area while moving from left to right along the main-scanning direction X (from left to right in FIG. 11A). At the time, if the print head 41 is inclined, the line formed by connecting the positions of the print head 41 on the upstream side and the downstream side in the sub-scanning direction Y is displaced from the state parallel to the sub-scanning direction Y, so that a pixel area unable to be printed (i.e., non-printable area Arn on which printing cannot be performed) is created. In the example shown in FIG. 11A, an area having a width (distance) of approximately three pixels (width d1 in FIG. 11A) in the main-scanning direction X is the pixel area unable to be printed (non-printable area Arn unable to be painted) by printing during the first pass with the first nozzles n1 on the first unit area.

FIG. 11B shows printing (printing end position of the print head 41) during the second pass on the first unit area.

As shown in FIG. 11B, the print head 41 performs printing during the second pass with the second nozzles n2 on the first unit area while moving from right to left along the main-scanning direction X (from right to left in FIG. 11B). In the example shown in FIG. 11B, an area having a width (distance) of approximately two pixels (width d2 in FIG. 11B) is the pixel area unable to be printed (non-printable area Arn unable to be painted) even by printing during the second pass with the second nozzles n2 on the first unit area.

While the second nozzles n2 perform printing during the second pass on the first unit area, the first nozzles n1 that have moved to the second unit area perform printing during the first pass on the second unit area.

FIG. 11C shows printing (printing start position of the print head 41) during the third pass on the first unit area.

As shown in FIG. 11C, the print head 41 performs printing during the third pass with the third nozzles n3 on the first unit area while moving from left to right along the main-scanning direction X (from left to right in FIG. 11C).

As described above, since the print head 41 is subjected to the abovementioned alignment on the upstream side in the sub-scanning direction Y, the nozzles close to the upstream side in the sub-scanning direction Y are less displaced from the sub-scanning direction Y than those far from the upstream side (i.e., close to the downstream side) in the sub-scanning direction Y. In the example shown in FIG. 11C, however, an area having a width of approximately one pixel (width d3 in FIG. 11C) is the pixel area unable to be printed (non-printable area Arn unable to be painted) even by printing during the third pass with the third nozzles n3 on the first unit area.

While the third nozzles n3 perform printing during the third pass on the first unit area, the first nozzles n1 that have moved to the third unit area perform printing during the first pass on the third unit area. Similarly, the second nozzles n2 that have moved to the second unit area perform printing during the second pass on the second unit area.

FIG. 11D shows printing (printing end position of the print head 41) during the fourth pass on the first unit area.

As shown in FIG. 11D, the print head 41 performs printing during the fourth pass with the fourth nozzles n4 on the first unit area while moving from right to left along the main-scanning direction X (from right to left in FIG. 11D).

As shown in FIG. 11D, by printing during the fourth pass with the fourth nozzles n4 on the first unit area, all the pixels Pi of the first unit area to its edge(s) become printable selected pixels Pc, and hence the pixel area unable to be printed (non-printable area Arn unable to be painted) no longer exists.

While the fourth nozzles n4 perform printing during the fourth pass on the first unit area, the first nozzles n1 that have moved to the fourth unit area perform printing during the first pass on the fourth unit area. Similarly, the second nozzles n2 that have moved to the third unit area perform printing during the second pass on the third unit area. Similarly, the third nozzles n3 that have moved to the second unit area perform printing during the third pass on the second unit area.

FIG. 12 to FIG. 16 illustrate the states shown in FIG. 11A to FIG. 11D on an actual design. Arrows in FIG. 12 to FIG. 16 each indicate the moving direction of the print head in main scanning.

Figure 12:
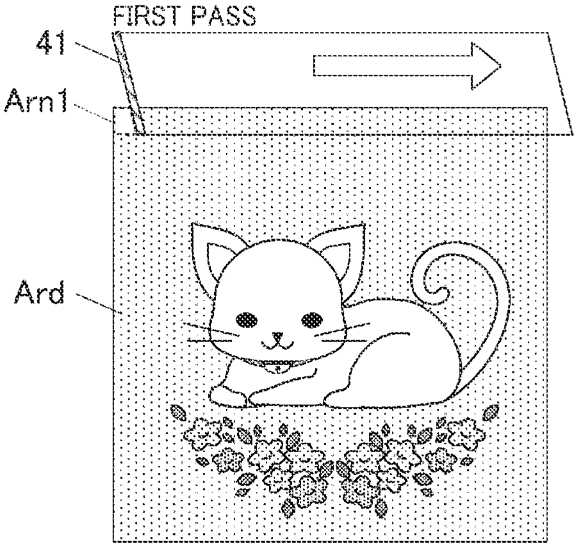
FIG. 12 illustrates the state shown in FIG. 11A on a design.

FIG. 12 corresponds to FIG. 11A and shows printing during the first pass on the first unit area. The pass shown in FIG. 12 is also the first pass of all the passes to print the design.

A parallelogram frame on the right of the print head 41 in FIG. 12 indicates a unit area on which the print head 41 performs printing during the first pass of all the passes to print the design. The first nozzles n1 are in charge of printing during the first pass on the first unit area, but the leading side of the print head 41 in the forward direction Ya of the sub-scanning direction Y, the leading side where the first nozzles n1 are provided, is inside the printing area Ard, so that a non-printable area Arn on which printing cannot be performed (non-printable area Arn1 that remains unpainted by the first nozzles n1) is created.

Figure 13A:
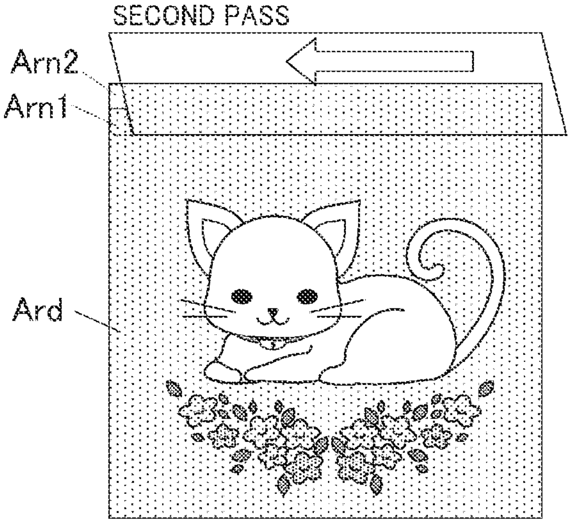
FIG. 13A illustrates the state shown in FIG. 11B on the design.
Figure 13B:
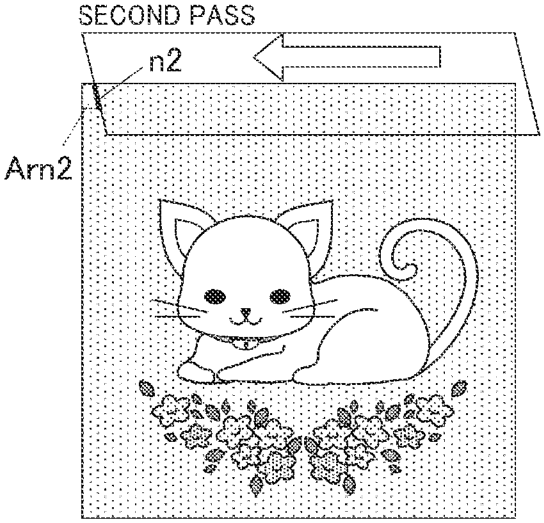
FIG. 13B illustrates the state shown in FIG. 11B on the design.

FIG. 13A and FIG. 13B correspond to FIG. 11B and show printing during the second pass on the first unit area. The second nozzles n2 are in charge of printing during the second pass on the first unit area. The pass shown in FIG. 13A and FIG. 13B is also the second pass of all the passes to print the design.

As shown in FIG. 13B, the second nozzles n2 can perform printing to/from farther left than the first nozzles n1, and hence can perform printing on a part of the non-printable area Arn1, which remains unpainted by the first nozzles n1. However, the non-printable area Arn on which printing cannot be performed (non-printable area Arn2 that remains unpainted even by the second nozzles n2) still remains.

Figure 14A:
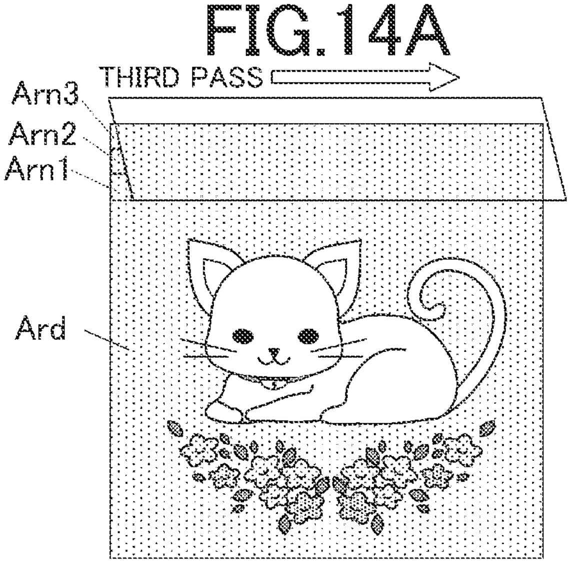
FIG. 14A illustrates the state shown in FIG. 11C on the design.
Figure 14B:
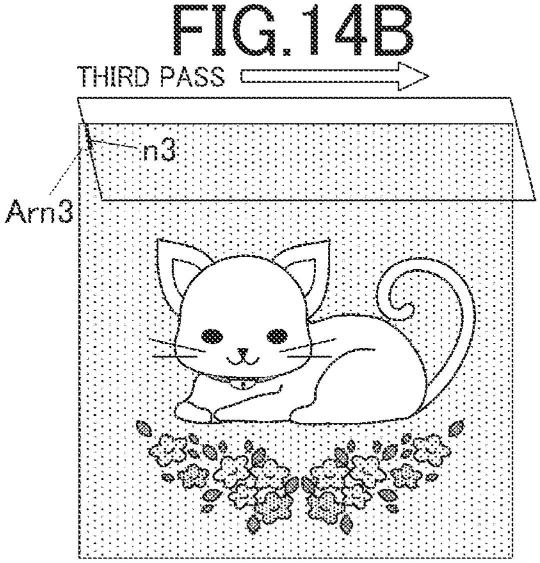
FIG. 14B illustrates the state shown in FIG. 11C on the design.

FIG. 14A and FIG. 14B correspond to FIG. 11C and show printing during the third pass on the first unit area. The third nozzles n3 are in charge of printing during the third pass on the first unit area. The pass shown in FIG. 14A and FIG. 14B is also the third pass of all the passes to print the design.

As shown in FIG. 14B, the third nozzles n3 can perform printing from/to farther left than the second nozzles n2, and hence can perform printing on a part of the non-printable area Arn, which remains unpainted by the second nozzles n2. However, the non-printable area Arn on which printing cannot be performed (non-printable area Arn3 that remains unpainted even by the third nozzles n3) still remains.

Figure 15A:
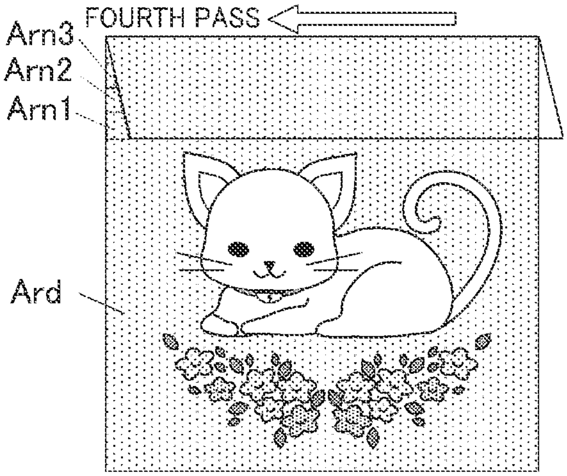
FIG. 15A illustrates the state shown in FIG. 11D on the design.
Figure 15B:
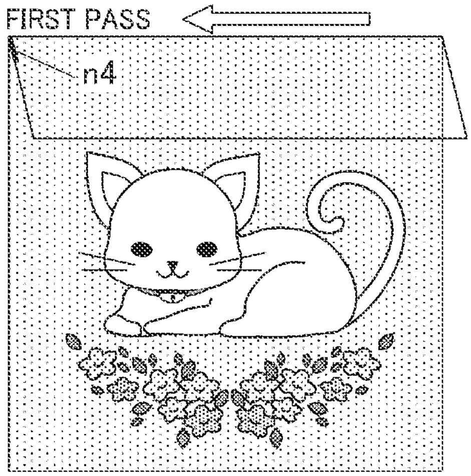
FIG. 15B illustrates the state shown in FIG. 11D on the design.

FIG. 15A and FIG. 15B correspond to FIG. 11D and show printing during the fourth pass on the first unit area. The fourth nozzles n4 are in charge of printing during the fourth pass on the first unit area. The pass shown in FIG. 15A and FIG. 15B is also the fourth pass of all the passes to print the design.

As shown in FIG. 15B, the fourth nozzles n4 can perform printing to/from farther left than the third nozzles n3, and hence can perform printing on approximately the entire printing area (first unit area). Hence, the non-printable area Arn3, which remains unpainted by the third nozzles n3, can be painted by the fourth nozzles n4. As a result, the non-printable area Arn on which printing cannot be performed no longer exists.

Figure 16:
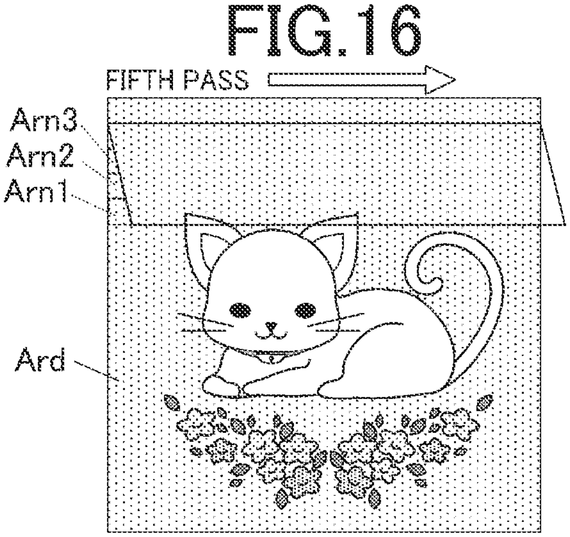
FIG. 16 illustrates a printing state in printing during the fifth pass of all the passes on the design.

FIG. 16 shows printing during the fifth pass of all the passes to print the design. Like the first unit area described above, the subsequent unit areas, such as the second unit area, the third unit area and the fourth unit area, have non-printable areas Arn1 to Arn3, but the first unit area no longer has any unpainted area/part. During the subsequent passes, in the same manner as described above, the non-printable areas Arn1 to Arn3 in the subsequent unit areas are filled by printings with other nozzles that are not nozzles originally in charge, so that a printed image is completed.

Figure 17:
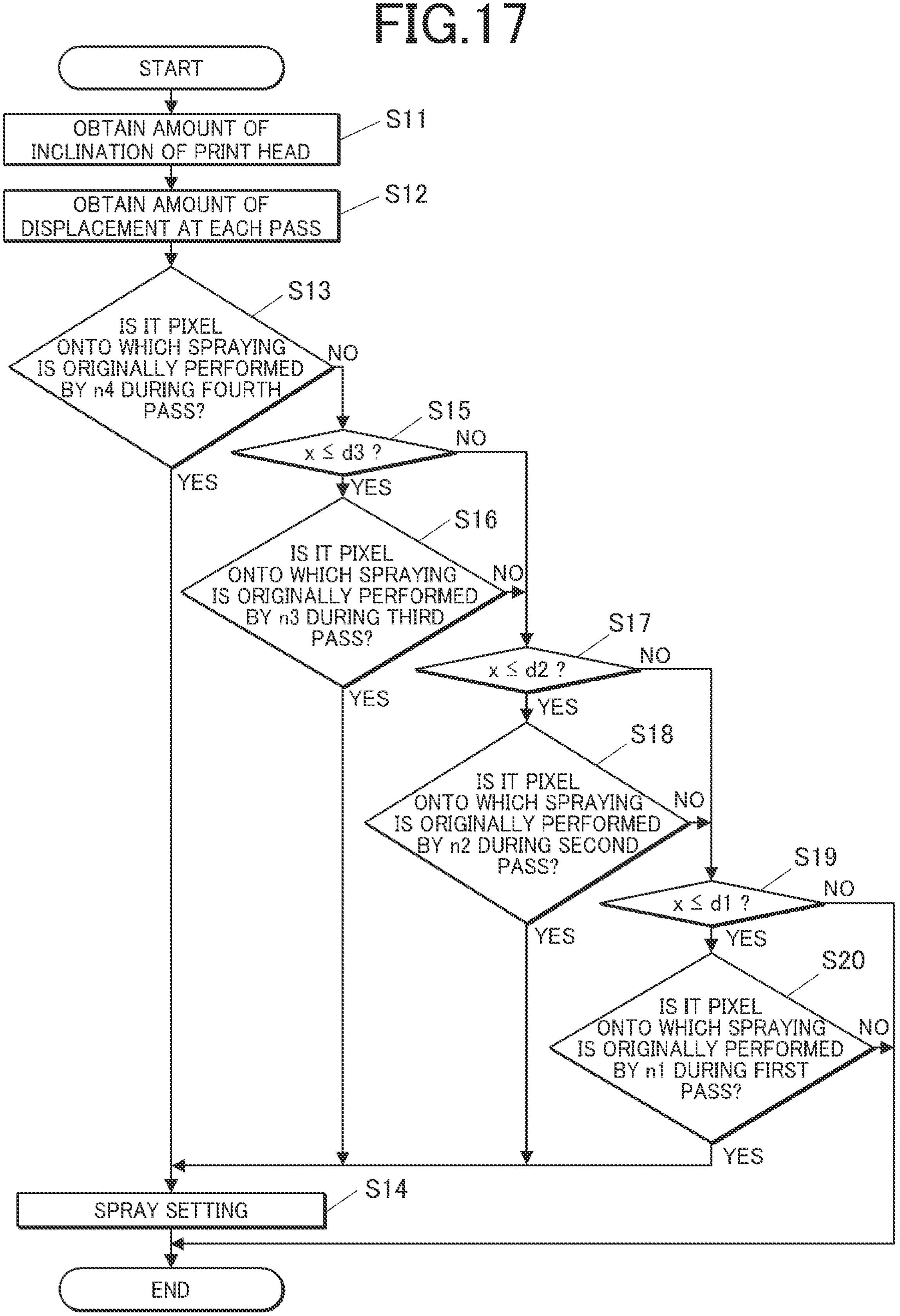
FIG. 17 is a flowchart of a second method of the print data correction method that is used in the case where the inclined print head performs printing.

FIG. 17 is a flowchart showing processes/steps of the second method.

In the second method, as in the first method, the controller 11 first obtains a correction value for the amount of inclination of the print head 41, and based on this correction value, determines whether a non-printable area Arn is created at an edge of the printing area Ard in the main-scanning direction X.

If the controller 11 determines that a non-printable area Arn is not created, the controller 11 causes the print head 41 to perform printing during all the passes using the inclination-correction-subjected data CId obtained by performing inclination correction on the print data Id, without performing the correction process of the second method.

On the other hand, if the controller 11 determines that a non-printable area Arn is created, the controller 11 assigns, about printing during the last pass (nth pass) among multiple passes, by which printing on each unit area is completed, the nozzles (nth nozzles nn) that are in charge of this last pass additional works to eject ink to fill the non-printable area Arn on which the other nozzles cannot perform printing. More specifically, the controller 11 performs a spray (print) setting about the nth nozzles nn only so as to fill the non-printable area Arn.

Printings with the other nozzles (first nozzles n1 to nth−1 nozzles nn−1) are printings using the inclination-correction-subjected data CId obtained by performing inclination correction on the print data Id. Hence, referring to FIG. 17, the spray setting for the nth nozzles nn, which is characteristic of the second method, will be described.

In this embodiment, printing on each unit area is performed by four passes. Hereinafter, therefore, the spray setting for the fourth nozzles n4 that are in charge of printing during the fourth pass on each unit area will be described as an example.

As to the direction and degree of inclination (amount of inclination or amount of displacement) of the print head 41, the conditions shown in FIG. 11A to FIG. 11D will be used.

As shown in FIG. 17, the controller 11 reads and obtains the amount of inclination (amount of displacement) "a" (shown in FIG. 8) of the print head 41 from the storage 12 or the like (Step S11), and obtains the amount of displacement ("d1", "d2", "d3" in FIG. 11A to FIG. 11D) indicating how much displacement occurs at each pass, namely what is the width of the non-printable area Arn, on which printing cannot be performed, in the main-scanning direction at each pass (Step S12).

Values of the amount of displacement at respective passes, namely "d1", "d2", "d3", . . . (d1>0, d2>0, d3>0, . . . ), can be derived from a general correlation or the like if conditions, such as the amount of inclination of the print head 41 and the number of passes by which printing on each unit area is performed, are determined.

Figure 18:
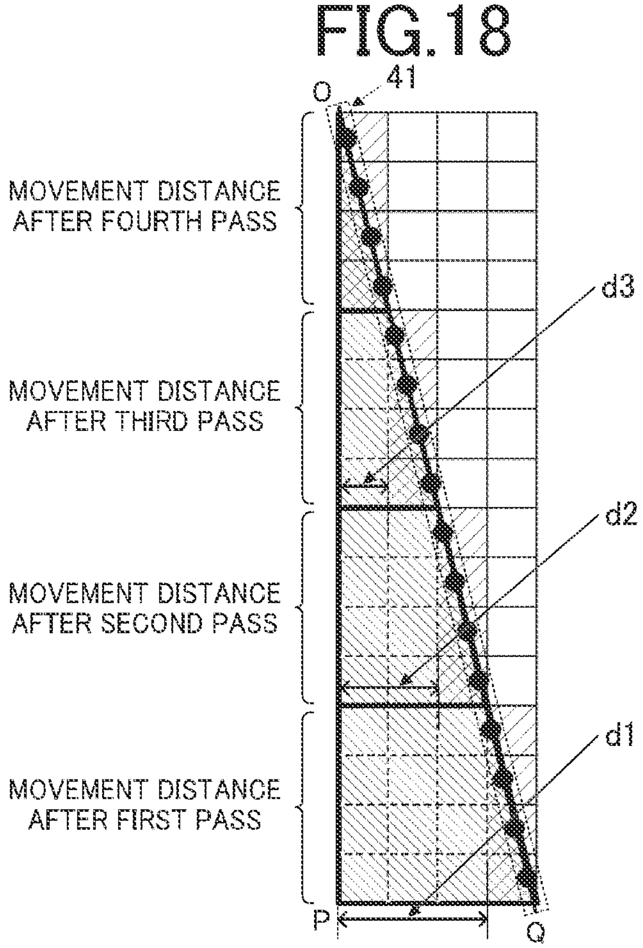
FIG. 18 illustrates a method for calculating the amount of displacement at each pass.

FIG. 18 illustrates how to obtain the amount of displacement at each pass.

As shown in FIG. 18, in a case of a right triangle OPQ, the distance between P and Q, "d1", is equal to the amount of inclination (amount of displacement) "a" of the print head 41 (d1=a).

Further, since the print head 41 moves in the sub-scanning direction Y a distance obtained by equally dividing the head length of the print head 41 (nozzle line length of the nozzle line 411 of the print head 41) after each pass, movement distances of the print head 41 after respective passes are all the same.

Hence, relationships "$d2=\frac{2}{3}\times d1$" and "$d3=\frac{1}{3}\times d1$" hold, and "d1", "d2" and "d3" can be obtained accordingly.

Then, the controller 11 refers to spray conditions of the nozzles (nozzle group, fourth nozzles n4 in this embodiment) that are in charge of printing during the last pass (fourth pass in this embodiment) on each unit area in a case where printing on each unit area is performed by multiple passes, and determines whether a pixel(s) is a pixel(s) onto which spraying is originally performed by the nozzle(s) (i.e., fourth nozzle(s) n4) during the last pass, namely the fourth pass, on a unit area (Step S13). If the pixel is the one on which the fourth nozzle(s) n4 originally performs printing (Step S13; YES), the controller 11 performs the spray setting by which the fourth nozzle(s) n4 performs spraying thereto as it originally does (Step S14).

On the other hand, if the pixel is not the one on which the fourth nozzle(s) n4 originally performs printing (Step S13; NO), the controller 11 determines whether a value x (x>0) of the position (X coordinate) of the pixel in the main-scanning direction X is (equal to or) smaller than d3 (Step S15). If the value x is smaller than d3 (Step S15; YES), the controller 11 determines whether the pixel is a pixel onto which spraying is originally performed by the third nozzle(s) n3 during the third pass on the unit area (Step S16). If the pixel is the one onto which spraying is originally performed by the third nozzle(s) n3 (Step S16; YES), the controller 11 performs the spray setting by which the fourth nozzle(s) n4 performs spraying thereto (Step 14).

On the other hand, if the value x of the position of the pixel in the main-scanning direction X is not smaller than d3 (Step S15; NO) or the pixel is not the one onto which spraying is originally performed by the third nozzle(s) n3 (Step S16; NO), the controller 11 determines whether the value x of the position of the pixel in the main-scanning direction X is (equal to or) smaller than d2 (Step S17). If the value x is smaller than d2 (Step S17; YES), the controller 11 determines whether the pixel is a pixel onto which spraying is originally performed by the second nozzle(s) n2 during the second pass on the unit area (Step S18). If the pixel is the one onto which spraying is originally performed by the second nozzle(s) n2 (Step S18; YES), the controller 11 performs the spray setting by which the fourth nozzle(s) n4 performs spraying thereto (Step S14).

On the other hand, if the value x of the position of the pixel in the main-scanning direction X is not smaller than d2 (Step S17; NO) or the pixel is not the one onto which spraying is originally performed by the second nozzle(s) n2 (Step S18; NO), the controller 11 determines whether the value x of the position of the pixel in the main-scanning direction X is (equal to or) smaller than d1 (Step S19). If the value x is smaller than d1 (Step S19; YES), the controller 11 determines whether the pixel is a pixel onto which spraying is originally performed by the first nozzle(s) n1 during the first pass on the unit area (Step S20). If the pixel is the one onto which spraying is originally performed by the first nozzle(s) n1 (Step S20; YES), the controller 11 performs the spray setting by which the fourth nozzle(s) n4 performs spraying thereto (Step S14).

On the other hand, if the pixel is not the one onto which spraying is originally performed by the first nozzle(s) n1 (Step S20; NO), the controller 11 ends the process without performing the spray setting by which the fourth nozzle(s) n4 performs spraying thereto.

In each of Steps S15, S17 and S19, if the value x of the position of the pixel in the main-scanning direction X is equal to the value of the amount of displacement (i.e., "d3", "d" or "d1"), the controller 11 may treat the value x as a value that satisfies the condition (i.e., "YES") or as a value that does not satisfy the condition (i.e., "NO").

Thus, the spray setting for the fourth nozzles n4 (nth nozzles nn) enables the fourth nozzles n4 (nth nozzles nn) that are in charge of printing during the fourth pass (nth pass or last pass) on each unit area to perform spraying to the part onto which the first nozzles n1 cannot perform spraying during the first pass, to the part onto which the second nozzles n2 cannot perform spraying during the second pass and to the part onto which the third nozzles n3 cannot perform spraying during the third pass, as substitutes.

In this embodiment described with reference to FIG. 11A to FIG. 11B, FIG. 17 and so forth, the difference between the amounts of displacement at every two consecutive passes (i.e., positional difference between every two consecutive passes) is one pixel, to be more specific, d1 is three pixels, d2 is two pixels, and d3 is one pixel. However, the amount of displacement that can be handled is not limited thereto.

Figure 19A:
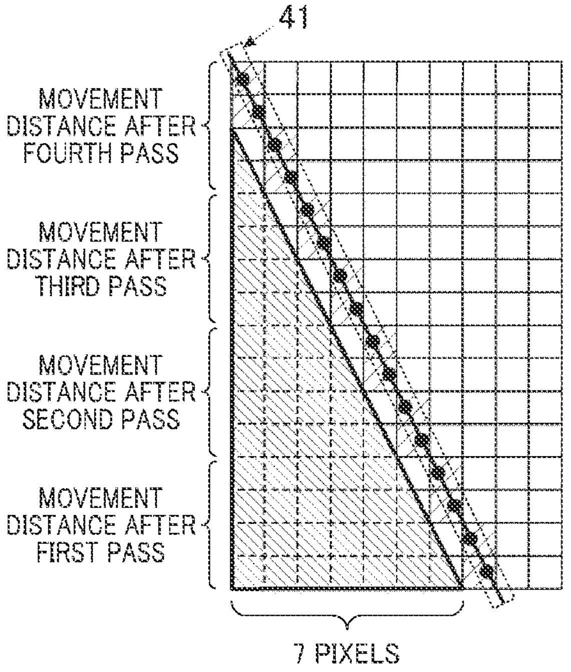
FIG. 19A is a schematic illustration showing a state in which a large difference occurs between passes due to the inclination of the print head.
Figure 19B:
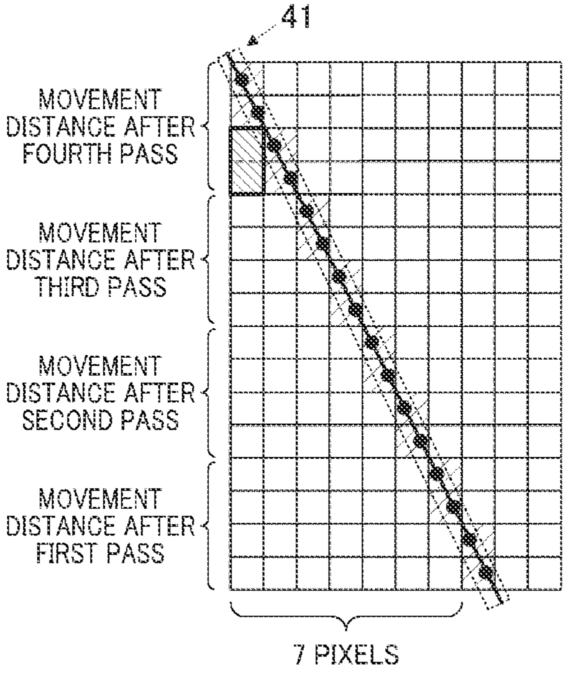
FIG. 19B illustrates a case where print data is corrected by the second method in the state shown in FIG. 19A.

For example, if, as shown in FIG. 19A, the positional difference between every two consecutive passes is larger, and the largest amount of displacement (i.e., largest positional difference between passes) is seven pixels, it is difficult to completely correct this with the above-described method only. However, the spray setting for the fourth nozzles n4, which are in charge of the fourth pass, in a case where printing on each unit area is performed by four passes can reduce the area unable to be painted to an area having a width of one pixel in the main-scanning direction X as shown in FIG. 19B. This contributes to improvement of quality of printing.

As described above, according to this embodiment, in a case where the print head 41 that performs printing on the printing target is inclined from the state parallel to the sub-scanning direction Y, which is the first direction, toward the main-scanning direction X, which is the second direction intersecting with the first direction, and a non-printable area Arn on which printing cannot be performed is created, the controller 11 generates, based on the amount of displacement (amount of inclination) of the print head 41 toward the main-scanning direction X and an area on which printing is performed in a case where the print head 41 is not inclined toward the main-scanning direction X, corrected print data according to the amount of displacement (amount of inclination).

This reduces, if the print head 41 is inclined from its proper direction, influence of the inclination as much as possible and can improve quality of printing.

Further, the corrected print data is data generated by extending print data by assigning a blank pixel(s) Pb that is not printed to an edge area of the print data.

Thus, print data is extended such that pixels to be printed are located in a printable area. This reduces irregularities of a printed image that appear at its edges in the main-scanning direction X and can achieve a high-quality finish.

Further, even if the print head 41 is greatly inclined, it can be handled by assigning a greater number of blank pixels Pb.

Further, the corrected print data includes information to change the coordinate(s) of the printing start position.

This makes it possible to recognize, as the printing area, an area that includes the area to which blank pixels Pb are added (assigned), and arrange the print head 41 at a proper printing start position.

Further, the corrected print data is data generated by assigning, according to the amount of displacement (amount of inclination), a blank pixel(s) Pb that is not printed to data for an area (excessive area Arm) (i) on which printing is not performed in the case where the print head 41 is not inclined toward the main-scanning direction X, which is the second direction, and (ii) that is created by the inclination of the print head 41 toward the main-scanning direction X, which is the second direction.

Adding (assigning) blank pixels Pb corresponding to the non-printable area Arn to the excessive area Arm as an excessive data area that is created at the edge opposite to the edge where the non-printable area Arn is created can prevent actual printing on the excessive area Arm.

Further, the print head 41 performs printing on a unit area by a plurality of passes from the first pass to the nth pass in the main-scanning direction X, which is the second direction, and includes a plurality of nozzles from the first nozzles n1 to the nth nozzles nn that are in charge of printing during the first pass to printing during the nth pass, respectively, and the corrected print data is data generated to cause, among the plurality of nozzles, a nozzle(s) (e.g., nth nozzles nn that are in charge of the last pass) as a substitute(s) to perform printing on the non-printable area Arn where a nozzle(s) originally in charge of printing thereon cannot perform printing due to the inclination of the print head 41 toward the second direction.

This can solve decrease in quality of printing results due to the inclination of the print head 41 without extending print data, changing the coordinate(s) of the printing start position or the like.

Further, the controller 11 causes the print head 41 to perform printing so as to fill the non-printable area Arn with the nth nozzle(s) nn that is in charge of printing during the nth pass.

This can solve decrease in quality of printing results due to the inclination of the print head 41 with a relatively easy process.

Although one or more embodiments of the present disclosure have been described above, it goes without saying that the present disclosure is not limited to the embodiments, and can be modified in a variety of respects without departing from its scope.

For example, in the above embodiment, the printing device 1 cooperates with the terminal device 8, thereby constituting a printing system, and, for example, a nail design is selected with the terminal device 8, and printing is performed by the printing device 1. However, the printing device 1 is not limited thereto.

For example, the user may make various operations through the operation unit 21 or the display 22 of the printing device 1, and the control unit 10 of the printing device 1 may perform various processes in accordance with these operations. In this case, the printing device 1 may complete printing by itself without cooperating with the terminal device 8. Further, the degree of cooperation (degree of process sharing) of the printing device 1 and the terminal device 8 may be changed from that in the above embodiment. For example, the terminal device 8 may be in charge of most processes except for imaging and printing. If the control unit 80 of the terminal device 8 performs the processes that the control unit 10 of the printing device 1 performs as the printing control device in the above embodiment, the control unit 80 of the terminal device 8 functions as the printing control device. In this case, the program(s) for the processes that the printing control device performs are stored in the storage 82 or the like of the control unit 80.

Further, various data, such as nail designs, captured nail images and shape information on nails, may be stored in the storage 82 of the terminal device 8 or the storage 12 of the printing device 1.

Alternatively or additionally, various data may be stored in a server device or the like to which the terminal device 8 or the printing device 1 is connectable via a network line or the like, and the terminal device 8 or the printing device 1 may be configured to refer to the data by accessing the server device or the like. This makes it possible to select a nail design to be printed from a larger number of nail designs.

Although one or more embodiments of the present disclosure have been described above, the scope of the present disclosure is not limited to the embodiments described above, but includes the scope of the present disclosure stated in claims and its equivalents.

The invention claimed is:

1. A printing control method comprising;

wherein each time a print head, in which a plurality of nozzles for ejecting ink is arranged in a sub-scanning direction to have a nozzle arrangement length of a first distance, is moved in a main-scanning direction, the print head is moved in the sub-scanning direction for a second distance shorter than the first distance, thereby controlling a printing device to perform printing onto a same position multiple times; and in a case where a nozzle arrangement direction in which the plurality of nozzles is arranged is inclined at a predetermined angle from the sub-scanning direction, and accordingly among the multiple times of the printing, at printing before last printing, none of the plurality of nozzles correspond to a first position to which the ink is to be ejected, generating print data corresponding to the predetermined angle such that among the plurality of nozzles, a nozzle that corresponds to the first position at the last printing ejects the ink to the first position to correspond to the last printing and ejects the ink to the first position to correspond to the printing before the last printing, at the last printing.

2. A printing control device comprising:

a memory where a program is stored; and at least one processor that executes the program stored in the memory, wherein each time a print head, in which a plurality of nozzles for ejecting ink is arranged in a sub-scanning direction to have a nozzle arrangement length of a first distance, is moved in a main-scanning direction, the print head is moved in the sub-scanning direction for a second distance shorter than the first distance, thereby controlling a printing device to perform printing onto a same position multiple times; and in a case where a nozzle arrangement direction in which the plurality of nozzles is arranged is inclined at a predetermined angle from the sub-scanning direction, and accordingly among the multiple times of the printing, at printing before last printing, none of the plurality of nozzles correspond to a first position to which the ink is to be ejected, generating print data corresponding to the predetermined angle such that among the plurality of nozzles, a nozzle that corresponds to the first position at the last printing ejects the ink to the first position to correspond to the last printing and ejects the ink to the first position to correspond to the printing before the last printing, at the last printing.

3. The printing control device according to claim 2, wherein the corrected print data is data generated by extending print data by assigning a blank pixel that is not printed to an edge area of the print data.

4. The printing control device according to claim 3, wherein the corrected print data includes information to change a coordinate of a printing start position.

5. The printing control device according to claim 2, wherein the print head performs printing on a unit area by a plurality of passes from a first pass to an nth pass in the second direction, and includes a plurality of nozzles from a first nozzle to an nth nozzle that are in charge of printing during the first pass to printing during the nth pass, respectively, and wherein the corrected print data is data generated to cause, among the plurality of nozzles, a nozzle as a substitute to perform printing on the non-printable area where a nozzle originally in charge of printing thereon cannot perform printing due to the inclination of the print head toward the second direction.

6. The printing control device according to claim 5, wherein the processor causes the print head to perform printing so as to fill the non-printable area with the nth nozzle that is in charge of printing during the nth pass.

7. The printing control device according to claim 2, wherein the corrected print data is data generated by assigning, according to the amount of displacement, a blank pixel that is not printed to data for an area (i) on which printing is not performed in the case where the print head is not inclined toward the second direction and (ii) that is created by the inclination of the print head toward the second direction.

8. The printing control device according to claim 2, wherein the first direction is a sub-scanning direction of the print head, and the second direction is perpendicular to the first direction and is a main-scanning direction of the print head.

9. A non-transitory computer-readable storage medium storing a program that causes a computer of a device including a print head that performs printing on a printing target to:

wherein each time a print head, in which a plurality of nozzles for ejecting ink is arranged in a sub-scanning direction to have a nozzle arrangement length of a first distance, is moved in a main-scanning direction, the print head is moved in the sub-scanning direction for a second distance shorter than the first distance, thereby controlling a printing device to perform printing onto a same position multiple times; and in a case where a nozzle arrangement direction in which the plurality of nozzles is arranged is inclined at a predetermined angle from the sub-scanning direction, and accordingly among the multiple times of the printing, at printing before last printing, none of the plurality of nozzles correspond to a first position to which the ink is to be ejected, generating print data corresponding to the predetermined angle such that among the plurality of nozzles, a nozzle that corresponds to the first position at the last printing ejects the ink to the first position to correspond to the last printing and ejects the ink to the first position to correspond to the printing before the last printing, at the last printing.

10. The printing control method according to claim 1, comprising: in a case where the nozzle arrangement direction in which the plurality of nozzles is arranged is inclined at a predetermined angle from the sub-scanning direction, and accordingly among the multiple times of the printing, at first printing, none of the plurality of nozzles correspond to the first position to which the ink is to be ejected, generating print data corresponding to the predetermined angle such that among the plurality of nozzles, a nozzle that corresponds to the first position at printing after the first printing ejects the ink to the first position to correspond to the printing before the first printing and ejects the ink to the first position to correspond to the first printing, at the printing after the first printing.

11. The printing control device according to claim 2, comprising: in a case where the nozzle arrangement direction in which the plurality of nozzles is arranged is inclined at a predetermined angle from the sub-scanning direction, and accordingly among the multiple times of the printing, at first printing, none of the plurality of nozzles correspond to the first position to which the ink is to be ejected, generating print data corresponding to the predetermined angle such that among the plurality of nozzles, a nozzle that corresponds to the first position at printing after the first printing ejects the ink to the first position to correspond to the printing before the first printing and ejects the ink to the first position to correspond to the first printing, at the printing after the first printing.

12. The non-transitory computer-readable storage medium according to claim 9, comprising: in a case where the nozzle arrangement direction in which the plurality of nozzles is arranged is inclined at a predetermined angle from the sub-scanning direction, and accordingly among the multiple times of the printing, at first printing, none of the plurality of nozzles correspond to the first position to which the ink is to be ejected, generating print data corresponding to the predetermined angle such that among the plurality of nozzles, a nozzle that corresponds to the first position at printing after the first printing ejects the ink to the first position to correspond to the printing before the first printing and ejects the ink to the first position to correspond to the first printing, at the printing after the first printing.

* * * * *